United States Patent [19]
Kawabata et al.

[11] Patent Number: 5,998,901
[45] Date of Patent: *Dec. 7, 1999

[54] POWER OUTPUT APPARATUS

[75] Inventors: Yasutomo Kawabata, Aichi-Ken; Masanao Shiomi; Shigeru Matsuhashi, both of Toyota, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/889,824

[22] Filed: Jul. 8, 1997

[30] Foreign Application Priority Data

Sep. 6, 1996 [JP] Japan .................................. 8-257599

[51] Int. Cl.⁶ ........................... H02K 16/00; H02K 49/06
[52] U.S. Cl. ............................................ 310/114; 310/103
[58] Field of Search ........................ 310/83, 103, 75 D, 310/114, 112

[56] References Cited

U.S. PATENT DOCUMENTS

| | | | |
|---|---|---|---|
| 1,491,492 | 4/1924 | Owen | 290/15 |
| 2,561,953 | 7/1951 | Roseau | 310/99 |
| 3,683,249 | 8/1972 | Shibata | 290/30 |
| 4,562,894 | 1/1986 | Yang | 180/65.2 |

FOREIGN PATENT DOCUMENTS

| | | |
|---|---|---|
| 58401 73 | 1/1975 | Australia . |
| 0 725 474 A1 | 8/1996 | European Pat. Off. . |
| 0 743 208 A2 | 11/1996 | European Pat. Off. . |
| 0 798 844 A1 | 10/1997 | European Pat. Off. . |
| 1 117 510 | 5/1956 | France . |
| 30 25 756 A1 | 1/1982 | Germany . |
| WO 89/04081 | 5/1989 | WIPO . |

*Primary Examiner*—Clayton LaBalle
*Attorney, Agent, or Firm*—Oliff & Berridge, PLC

[57] ABSTRACT

When power is output from an engine 50 to a crankshaft 56, a multiplying gear unit 57 attached to the crankshaft 56 increases a revolving speed but decreases a torque and transmits the increased revolving speed and the decreased torque to a rotating shaft 57e. A drive shaft 22 of a vehicle that cruises at a constant speed is generally driven at a higher revolving speed and a smaller torque than a driving point at which the engine 50 is driven with a high efficiency. The multiplying gear unit 57 converts the power output from the engine 50 to a power of high revolving speed and low torque. This structure decreases the amount of electrical energy transmitted between a clutch motor 30 and an assist motor 40 in the process of torque conversion by the clutch motor 30 and the assist motor 40 and thereby reduces an energy loss of both the motors 30 and 40. This effectively reduces the required capacities and size of the clutch motor 30 and the assist motor 40.

7 Claims, 10 Drawing Sheets

POWER OUTPUT APPARATUS

BACKGROUND OF THE INVENTION

1. Field of the Invention

The present invention relates to a power output apparatus, and more specifically to an power output apparatus for outputting power to a drive shaft.

2. Description of the Prior Art

In known power output apparatuses mounted on a vehicle, an output shaft of an engine is electromagnetically linked with a drive shaft, which connects with a rotor of a motor, by means of an electromagnetic coupling, so that the power output from the engine is transmitted to the drive shaft (as disclosed in, for example, JAPANESE PATENT LAYING-OPEN GAZETTE No. 53-133814). In this power output apparatus, the vehicle starts driving by the function of the motor. When the revolving speed of the motor reaches a predetermined level, the power output apparatus supplies an exciting electric current to the electromagnetic coupling to crank the engine and carries out a fuel supply into the engine and ignition with a spark, thereby starting the engine. After the engine starts, the power output from the engine is transmitted to the drive shaft via the electromagnetic coupling, in order to continue driving the vehicle. When the power transmitted to the drive shaft via the electromagnetic coupling is insufficient for the required power on the drive shaft, the motor is driven to supplement the insufficiency. The electromagnetic coupling regenerates electric power according to a slip of its electromagnetic connection while the power is transmitted to the drive shaft. The regenerative electric power is stored in a battery as electric power used for starting the vehicle or is used as a power of the motor to supplement the insufficiency of the power on the drive shaft.

In this known apparatus, the electromagnetic coupling can transmit part of the power output from the engine to the drive shaft and regenerate the residual power as electric power, irrespective of the driving point of the engine. The driving point of the engine can thus be arbitrarily set to have a high efficiency.

Even when the engine can be driven at the driving point of high efficiency, however, this conventional apparatus still has some problems; that is, a low efficiency of the whole power output apparatus and the large-sized electromagnetic coupling and motor. The efficiency of the whole power output apparatus depends upon not only the efficiency of the engine but the efficiencies of the electromagnetic coupling and the motor and the charge-discharge efficiencies of the battery. The low efficiencies of these constituents lead to a low efficiency of the whole power output apparatus. The power required for the drive shaft is generally different from the power output from the engine that is driven at the driving point of high efficiency, so that torque conversion of the power by means of the electromagnetic coupling and the motor is required. As discussed above, torque conversion involves the power directly transmitted to the drive shaft via the electromagnetic coupling and the power output to the drive shaft by supplying the electric power regenerated by the electromagnetic coupling to the motor. The latter torque conversion is implemented via the form of electrical energy. The large electrical energy causes a large energy loss and lowers the efficiency of the whole power output apparatus. The greater proportion of the latter torque conversion via the form of electrical energy requires the large capacity of electromagnetic coupling and the motor and thereby makes these constituents rather bulky.

SUMMARY OF THE INVENTION

One object of the present invention is to enhance the efficiency of a power output apparatus.

Another object of the present invention is to reduce the size of a power output apparatus.

At least part of the above and the other related objects is realized by a power output apparatus for outputting power to a drive shaft, which includes: an engine having an output shaft; a revolving speed multiplying means having a first rotating shaft connected with the output shaft of the engine and a second rotating shaft that is different from the first rotating shaft, the revolving speed multiplying means multiplying a revolving speed of either one of the two rotating shafts by a predetermined ratio; and a pair-rotor motor having a first rotor connected with the second rotating shaft of the revolving speed multiplying means and a second rotor linked with the drive shaft to be rotatable relative to the first rotor, wherein power is transmitted between the second rotating shaft of the revolving speed multiplying means and the drive shaft via an electromagnetic coupling of the first rotor with the second rotor.

The revolving speed multiplying means may be a multiplying gear for multiplying the revolving speed of the second rotating shaft relative to the first rotating shaft or alternatively a multiplying gear for multiplying the revolving speed of the first rotating shaft relative to the second rotating shaft. The term 'power' implies a power of rotation defined by a revolving speed and a torque. Even for an identical energy expressed in the form of the product of the revolving speed and the torque, different revolving speeds and different torques result in different powers. The revolving speed multiplying means thus decreases the torque with an increase in revolving speed.

In the power output apparatus of the present invention, a motor having the characteristics of a high revolving speed and a low torque is applied for the pair-rotor motor when the revolving speed multiplying means increases the revolving speed of the second rotating shaft. This enables the power output from the engine that is efficiently driven with a relatively low revolving speed and a relatively high torque to be efficiently output to the drive shaft that is driven with a relatively high revolving speed and a relatively low torque. When the revolving speed multiplying means increases the revolving speed of the first rotating shaft, on the other hand, a motor having the characteristics of a low revolving speed and a high torque is applied for the pair-rotor motor. This enables the power output from the engine that is efficiently driven with a relatively high revolving speed and a relatively low torque to be efficiently output to the drive shaft that is driven with a relatively low revolving speed and a relatively high torque.

The power output apparatus of the present invention may further include any one of a second motor for inputting and outputting power to and from the drive shaft, a second motor for inputting and outputting power to and from the second rotating shaft of the revolving speed multiplying means, and a second motor for inputting and outputting power to and from the output shaft of the engine. In these applications, even when the power output from the engine is significantly different from the power required for the drive shaft, the revolving speed multiplying means can make the output power close to the required power. This structure can effectively decrease either the electrical energy regenerated by the pair-rotor motor and consumed by the second motor or the electrical energy regenerated by the second motor and consumed by the pair-rotor motor, in the process of converting the power output from the engine by the pair-rotor motor and the second motor and outputting the converted power to the drive shaft. This reduces an energy loss of the pair-rotor motor and the second motor, thereby enhancing the efficiency of the whole power output apparatus. This structure decreases the electrical energies regenerated and consumed by the pair-rotor motor and the second motor, thereby reducing the required capacities of the pair-rotor motor and the second motor and reducing the size of the whole power output apparatus.

In accordance with one preferable application, the power output apparatus further includes a control means for driving and controlling the pair-rotor motor and the second motor, in order to enable the power output from the engine via the revolving speed multiplying means to be subjected to a torque conversion by the pair-rotor motor and the second motor and output to the drive shaft. This structure enables all the power output from the engine to be subjected to a torque conversion and output to the drive shaft.

In the power output apparatus having the second motor for inputting and outputting power to and from the drive shaft, the second motor may have the second rotor of the pair-rotor motor and a stator that can rotate the second rotor. This further reduces the size of the whole power output apparatus.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
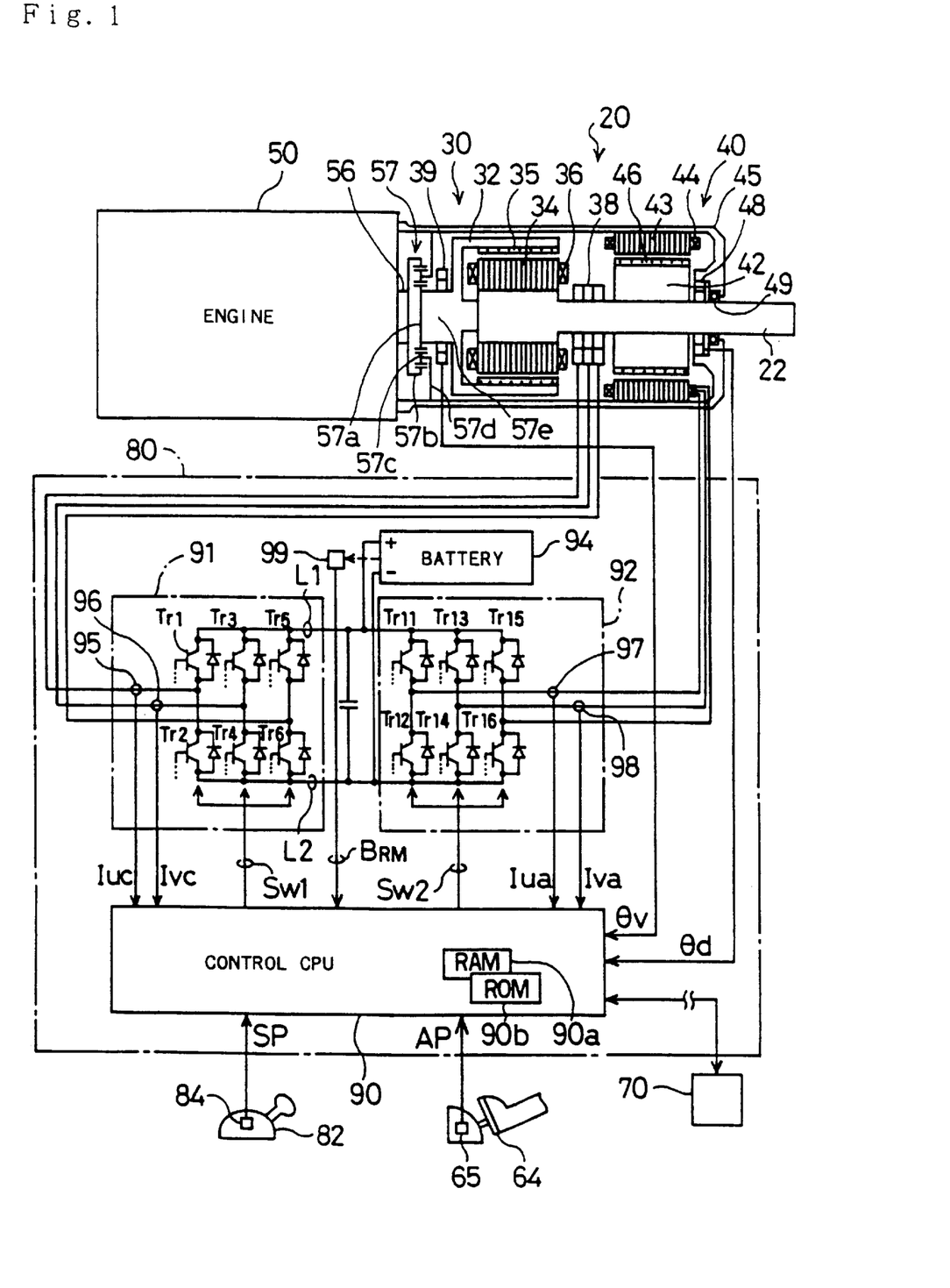
FIG. 1 schematically illustrates structure of a power output apparatus 20 embodying the present invention.
Figure 2:
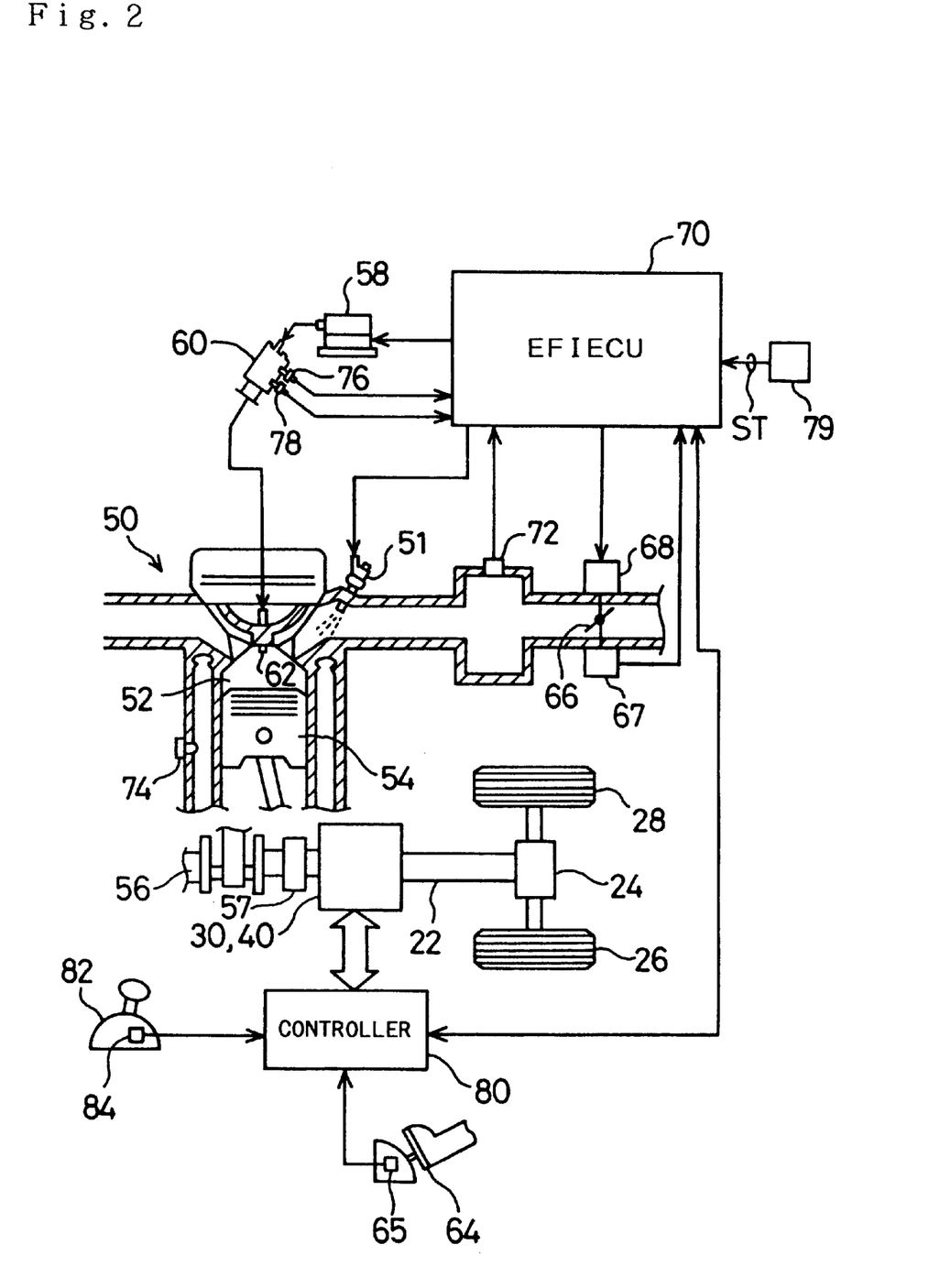
FIG. 2 schematically illustrates general structure of a vehicle with the power output apparatus 20 of the embodiment incorporated therein.

One mode of carrying out the present invention is described as a preferred embodiment. FIG. 1 schematically illustrates structure of a power output apparatus 20 embodying the present invention and FIG. 2 schematically illustrates general structure of a vehicle with the power output apparatus 20 of the embodiment incorporated therein. The general structure of the vehicle is described first for the convenience of explanation.

Referring to FIG. 2, the vehicle is provided with an engine 50 which consumes gasoline as a fuel and outputs power. The air ingested from an air supply system via a throttle valve 66 is mixed with a fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle valve position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

A multiplying gear unit 57 for multiplying the rotation of the crankshaft 56 and transmitting the multiplied rotation to a subsequent constituent is attached to the crankshaft 56 of the engine 50. The multiplying gear unit 57 is connected to a drive shaft 22 via a clutch motor 30 and an assist motor 40, which will be described in detail below. The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator pedal position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50 for generating power, the multiplying gear unit 57 connected to the crankshaft 56 of the engine 50, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to a rotating shaft 57e of the multiplying gear unit 57, whereas the inner rotor 34 thereof is mechanically linked with the rotor 42 of the assist motor 40.

The multiplying gear unit 57 is constructed as a planetary gear, which includes a sun gear 57a linked with the rotating shaft 57e, a ring gear 57b linked with the crankshaft 56, a plurality of planetary pinion gears 57c arranged between the sun gear 57a and the ring gear 57b to revolve around the sun gear 57a while rotating on its axis, and a planetary carrier 57d for supporting the respective rotating axes of the planetary pinion gears 57c. In this embodiment, the planetary carrier 57d is fixed to a casing 45 and thereby can not rotate. When 'm' represents a ratio of the number of teeth of the sun gear 57a to the number of teeth of the ring gear 57b, the revolving speed of the crankshaft 56 is transmitted as a 1/m-fold revolving speed to the rotating shaft 57e while the torque of the crankshaft 56 is transmitted as an m-fold torque to the rotating shaft 57e. In the description below, the ratio of the revolving speed of the rotating shaft 57e of the multiplying gear unit 57 to the revolving speed of the crankshaft 56 is expressed as a multiplying ratio $\rho$ ($\rho$=1/m).

Referring to FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a slip ring 38. Laminated sheets of non-directional electromagnetic steel are used to form teeth and slots for the three-phase coils 36 in the inner rotor 34. A resolver 39 for measuring a rotational angle $\theta v$ of the rotating shaft 57e is attached to the rotating shaft 57e of the multiplying gear unit 57.

The assist motor 40 is also constructed as a synchronous motor having three-phase coils 44, which are wound on a stator 43 fixed to the casing 45 to generate a revolving magnetic field. The stator 43 is also made of laminated sheets of non-directional electromagnetic steel. A plurality of permanent magnets 46 are attached to an outer surface of the rotor 42. In the assist motor 40, interaction between a magnetic field formed by the permanent magnets 46 and a revolving magnetic field formed by the three-phase coils 44 results in rotations of the rotor 42. The rotor 42 is mechanically linked with the drive shaft 22 working as the torque output shaft of the power output apparatus 20. A resolver 48 for measuring a rotational angle $\theta d$ of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the power is output from the engine 50 to the crankshaft 56, the multiplying gear unit 57 multiplies the revolving speed of the power while reducing the axial torque thereof. The multiplied revolving speed and the decreased torque are transmitted to the outer rotor 32 of the clutch motor 30. The transmitted torque is eventually output to the drive shaft 22 via the outer rotor 32 and the inner rotor 34 of the clutch motor 30, while the torque from the assist motor 40 is added to or subtracted from the torque transmitted to the drive shaft 22.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92, and a battery 94 including a number of secondary cells. The control CPU 90 is a one-chip microprocessor including a RAM 90a used as a working memory, a ROM 90b in which various control programs are stored, an input/output port (not shown), and a serial communication port (not shown) through which data are sent to and received from the EFIECU 70. The control CPU 90 receives a variety of data via the input port. The input data include a rotational angle $\theta v$ of the rotating shaft 57e of the multiplying gear unit 57 measured with the resolver 39, a rotational angle $\theta d$ of the drive shaft 22 measured with the resolver 48, an accelerator pedal position AP (step-on amount of the accelerator pedal 64) output from the accelerator pedal position sensor 65, a gearshift position SP output from the gearshift position sensor 84, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines L1 and L2. The three-phase coils (U,V,W) 36 of the clutch motor 30 are connected via the slip ring 38 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 36 undergoes PWM (pulse width modulation) to give a quasi-sine wave, which enables the three-phase coils 36 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 of the embodiment thus constructed follows the operation principle, especially the principle of torque conversion, discussed below. By way of example, it is assumed that the engine 50 is driven by the EFIECU 70 at a driving point defined by a revolving speed Ne and a torque Te. Under such conditions, power defined by a revolving speed Nv calculated by Nv=Ne×$\rho$ and a torque Tv calculated by Tv=Te/$\rho$ is transmitted to the rotating shaft 57e of the multiplying gear unit 57. While the transistors Tr1 through Tr6 in the first driving circuit 91 are in OFF position, the controller 80 does not supply any electric current to the three-phase coils 36 of the clutch motor 30 via the slip ring 38. No supply of electric current causes the outer rotor 32 of the clutch motor 30 to be electromagnetically disconnected from the inner rotor 34. This results in racing the rotating shaft 57e of the multiplying gear unit 57. Under the condition that all the transistors Tr1 through Tr6 are in OFF position, there is no regeneration of energy from the three-phase coils 36.

As the control CPU 90 of the controller 80 outputs the first control signal SW1 to control on and off the transistors Tr1 through Tr6 in the first driving circuit 91, a constant electric current flows through the three-phase coils 36 of the clutch motor 30, based on the difference between the revolving speed Nv of the rotating shaft 57e of the multiplying gear unit 57 and a revolving speed Nd of the drive shaft 22 (in other words, a difference Nc (=Nv−Nd) between the revolving speed of the outer rotor 32 and that of the inner rotor 34 in the clutch motor 30). When the revolving speed Nd of the drive shaft 22 is a value Nd1 that is lower than the revolving speed Nv of the rotating shaft 57e of the multiplying gear unit 57, the clutch motor 30 functions as a generator and carries out the regenerative operation to regenerate an electric current via the first driving circuit 91. The battery 94 is then charged with this regenerative electric power. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 3:
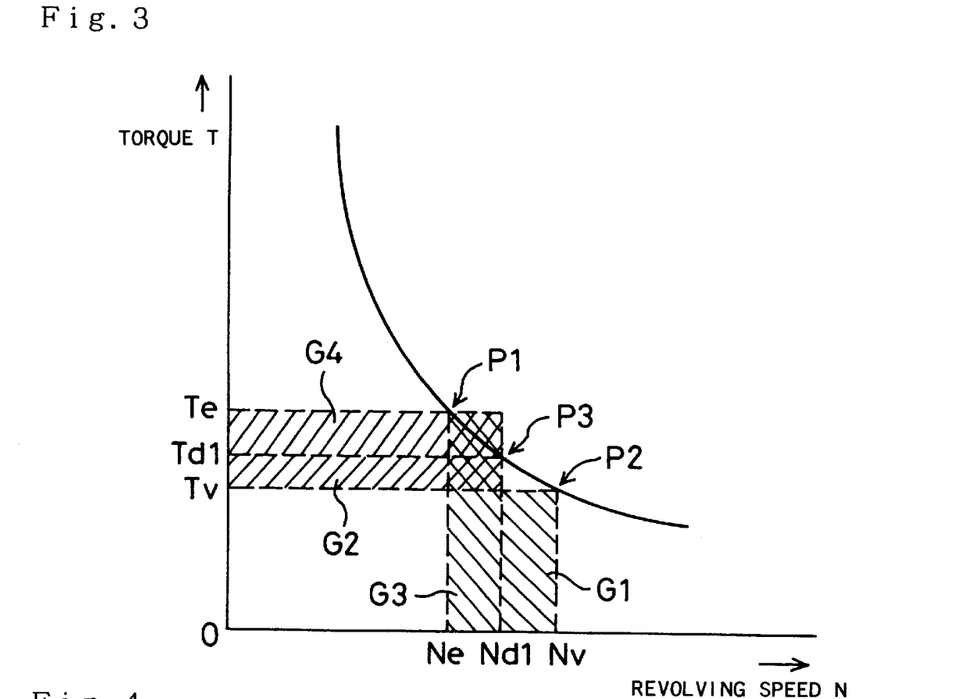
FIG. 3 is a graph showing operation of the power output apparatus 20 under the condition of Ne<Nd<Nv.

Referring to FIG. 3, when the engine 50 is driven at a driving point P1 defined by the revolving speed Ne and the torque Te, the multiplying gear unit 57 functions to allow its rotating shaft 57e to be driven at a driving point P2 defined by the revolving speed Nv and the torque Tv. The clutch motor 30 and the assist motor 40 accordingly carry out the torque conversion from the driving point P2 of the rotating shaft 57e of the multiplying gear unit 57 to a driving point P3 of the drive shaft 22. Namely the clutch motor 30 regenerates an energy defined by a rectangular area G1 having the points P2 and Nd1 as opposite angles, whereas the assist motor 40 outputs this regenerative energy to the drive shaft 22 as an energy defined by a rectangular area G2 having the points P3 and Tv as opposite angles.

It is here assumed that the power output apparatus 20 does not have the multiplying gear unit 57 and that the outer rotor 32 of the clutch motor 30 is directly connected to the crankshaft 56 of the engine 50. In this case, the clutch motor 30 and the assist motor 40 carry out the torque conversion from the driving point P1 of the engine 50 having the smaller revolving speed than the revolving speed Nd1 of the drive shaft 22 to the driving point P3 of the drive shaft 22. The clutch motor 30 thus outputs an energy defined by a rectangular area G3 having the points P1 and Nd1 as opposite angles to the drive shaft 22, whereas the assist motor 40 regenerates the energy required for driving the clutch motor 30 from the drive shaft 22 as an energy defined by a rectangular area G4 having the points P3 and Te as opposite angles. Since a rectangular area having the points P1 and P3 as opposite angles is included both in the area G3 and in the area G4, the energy transmission by the clutch motor 30 and the assist motor 40 becomes greater than the energy transmission defined by a residual area by omitting the overlapped area from the areas G3 and G4 (the minimum energy transmission in the graph of FIG. 3). This leads to a large energy loss by the clutch motor 30 and the assist motor 40 and thereby lowers the efficiency of the whole power output apparatus 20. When the power output apparatus 20 has the multiplying gear unit 57 like the embodiment, on the other hand, the torque conversion is carried out from the driving point P2 having the revolving speed higher than the revolving speed Nd1 of the drive shaft 22. This cancels the overlapped area in the energy transmission by the clutch motor 30 and the assist motor 40 and thereby enhances the efficiency of the whole power output apparatus 20, compared with the conventional structure without the multiplying gear unit 57.

Figure 4:
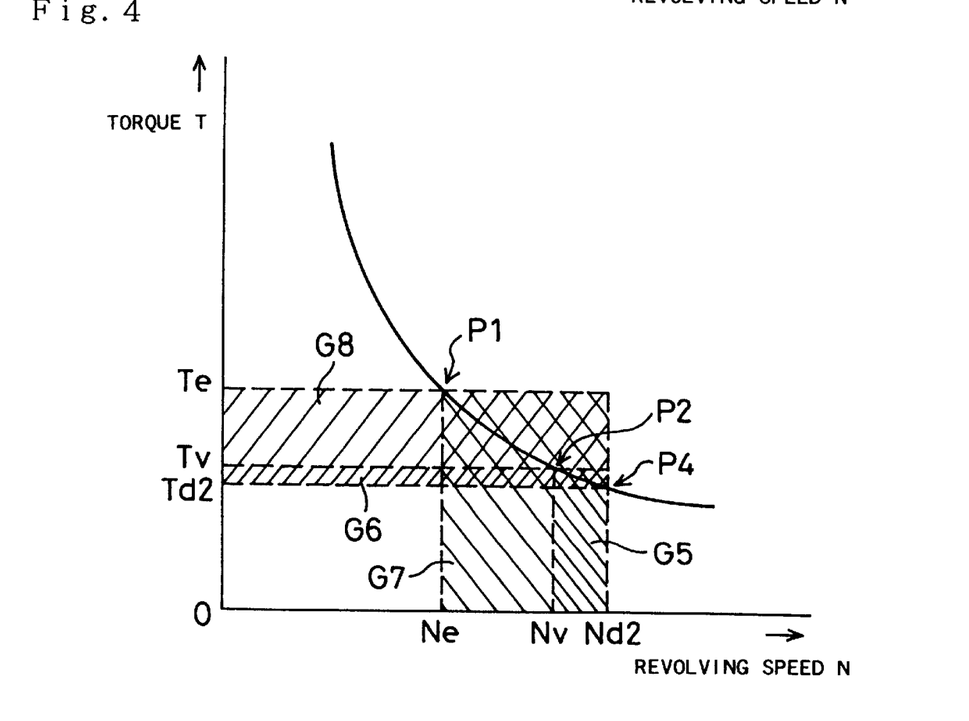
FIG. 4 is a graph showing operation of the power output apparatus 20 under the condition of Ne<Nv<Nd.

When the revolving speed Nd of the drive shaft 22 is a value Nd2 that is greater than the revolving speed Nv of the rotating shaft 57e of the multiplying gear unit 57, on the contrary, the clutch motor 30 functions as a normal motor and consumes electric power discharged from the battery 94 to supply the energy of rotational motion to the drive shaft 22. When the control CPU 90 of the controller 80 controls the second driving circuit 92 in order to enable the assist motor 40 to regenerate an electrical energy that is identical with the electrical energy consumed by the clutch motor 30 as electric power, a slip between the rotor 42 and the stator 43 of the assist motor 40 makes the regenerative current flow through the three-phase coils 44. This allows the electric power consumed by the clutch motor 30 to be supplied by the assist motor 40. Referring to FIG. 4, when the engine 50 is driven at the driving point P1 defined by the revolving speed Ne and the torque Te, the multiplying gear unit 57 functions to allow its rotating shaft 57e to be driven at the driving point P2 defined by the revolving speed Nv and the torque Tv. The clutch motor 30 and the assist motor 40 accordingly carry out the torque conversion from the driving point P2 of the rotating shaft 57e of the multiplying gear unit 57 to a driving point P4 of the drive shaft 22. Namely the clutch motor 30 outputs an energy defined by a rectangular area G5 having the points P2 and Nd2 as opposite angles, whereas the assist motor 40 regenerates the energy required for driving the clutch motor 30 from the drive shaft 22 as an energy defined by a rectangular area G6 having the points P4 and Tv as opposite angles.

It is here assumed that the power output apparatus 20 does not have the multiplying gear unit 57. In this case, the clutch motor 30 and the assist motor 40 carry out the torque conversion from the driving point P1 of the engine 50 to the driving point P4 of the drive shaft 22. The clutch motor 30 thus outputs an energy defined by a rectangular area G7 having the points P1 and Nd2 as opposite angles to the drive shaft 22, whereas the assist motor 40 regenerates the energy required for driving the clutch motor 30 from the drive shaft 22 as an energy defined by a rectangular area G8 having the points P4 and Te as opposite angles. The energy transmission by the clutch motor 30 and the assist motor 40 in the power output apparatus 20 of the embodiment with the multiplying gear unit 57 (that is, the energy transmission defined by the areas G5 and G6) is smaller than the energy transmission in the conventional structure without the multiplying gear unit 57 (that is, the energy transmission defined by the areas G7 and G8). This leads to a smaller energy loss by the clutch motor 30 and the assist motor 40 and enhances the efficiency of the whole power output apparatus 20.

Figure 5:
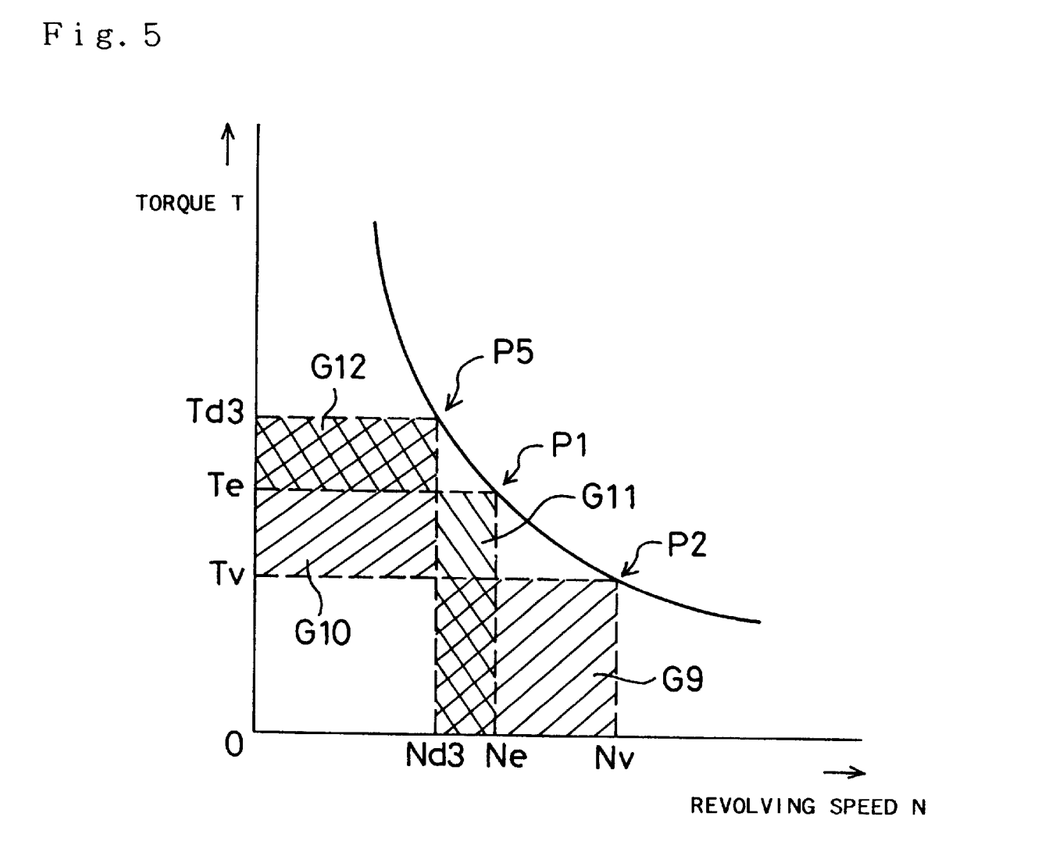
FIG. 5 is a graph showing operation of the power output apparatus 20 under the condition of Nd<Ne<Nv.

As another example, the revolving speed Nd of the drive shaft 22 is a value Nd3 that is smaller than the revolving speed Ne of the engine 50 as shown in FIG. 5. In this case, the clutch motor 30 and the assist motor 40 carry out the torque conversion from the driving point P2 of the rotating shaft 57e of the multiplying gear unit 57 to a driving point P5 of the drive shaft 22. Namely the clutch motor 30 regenerates an energy defined by a rectangular area G9 having the points P2 and Nd3 as opposite angles, whereas the assist motor 40 outputs this regenerative energy to the drive shaft 22 as an energy defined by a rectangular area G10 having the points P5 and Tv as opposite angles. In the structure without the multiplying gear unit 57, on the other hand, the clutch motor 30 and the assist motor 40 carry out the torque conversion from the driving point P1 of the engine 50 to the driving point P5 of the drive shaft 22. The clutch motor 30 thus regenerates an energy defined by a rectangular area G11 having the points P1 and Nd3 as opposite angles, whereas the assist motor 40 outputs this regenerative energy to the drive shaft 22 as an energy defined by a rectangular area G12 having the points P5 and Te as opposite angles. The energy transmission by the clutch motor 30 and the assist motor 40 in the power output apparatus 20 of the embodiment with the multiplying gear unit 57 (that is, the energy transmission defined by the areas G9 and G10) is greater than the energy transmission in the conventional structure without the multiplying gear unit 57 (that is, the energy transmission defined by the areas G11 and G12). This leads to a greater energy loss by the clutch motor 30 and the assist motor 40 and lowers the efficiency of the whole power output apparatus 20.

As clearly understood from the above discussion, the power output apparatus 20 of the embodiment has a high efficiency under the condition that the drive shaft 22 has a high revolving speed Nd and a small torque Td, and has a low efficiency under the condition that the drive shaft 22 has a low revolving speed Nd and a large torque Td. Such fundamental torque conversion is generally carried out when the vehicle cruises at a constant speed, that is, when the drive shaft 22 has a relatively high revolving speed Nd and a relatively small torque Td. The structure with the multiplying gear unit 57 accordingly enhances the efficiency of the whole power output apparatus 20. The multiplying ratio ρ of the multiplying gear unit 57 depends upon the characteristics of the engine 50 and the application of the vehicle with the power output apparatus 20 mounted thereon.

The power output apparatus 20 of the embodiment can perform a variety of operations as well as the above fundamental torque conversion. These operations are implemented by regulating the power output from the engine 50 (that is, the product of the torque Te and the revolving speed Ne), the electrical energy regenerated or consumed by the clutch motor 30, and the electrical energy regenerated or consumed by the assist motor 40, based on the driving state of the vehicle and the remaining charge BRM of the battery 94. The possible operations include an operation of charging the battery 94 with the surplus electrical energy, an operation of enabling the assist motor 40 to output a large torque to the drive shaft 22 using the electric power stored in the battery 94 as well as the power output from the engine 50 and subjected to the torque conversion, and an operation of driving the drive shaft 22 only by the assist motor 40 using the electric power stored in the battery 94. When the vehicle runs at a low speed and requires a large torque, that is, when the drive shaft 22 has a relatively low revolving speed Nd and a relatively large torque Td, the operation is carried out to drive the drive shaft 22 only by the assist motor 40 or to enable the assist motor 40 to output a large torque to the drive shaft 22 using the electric power stored in the battery 94 as well as the power output from the engine 50 and subjected to the torque conversion. The efficiency is thus substantially unchanged irrespective of the presence or the absence of the multiplying gear unit 57, when the drive shaft 22 has a low revolving speed Nd and a large torque Td.

Figure 6:
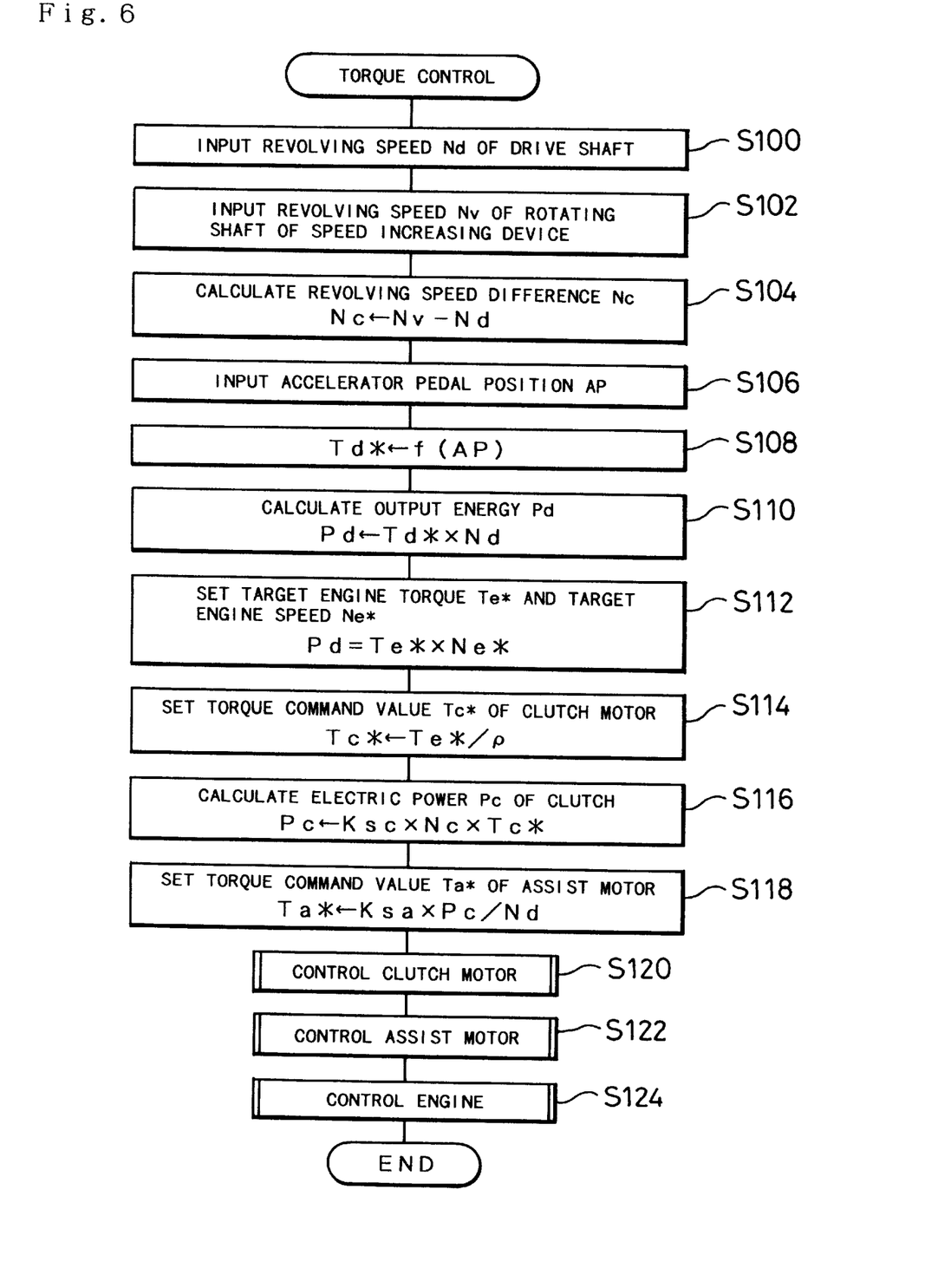
FIG. 6 is a flowchart showing a torque control routine executed by the control CPU 90 of the controller 80.

The power output apparatus 20 of the embodiment carries out the torque conversion according to a torque control routine shown in the flowchart of FIG. 6, so as to enable the power output from the engine 50 to be converted by the clutch motor 30 and the assist motor 40 and output to the drive shaft 22. The torque control routine is executed repeatedly at predetermined time intervals (for example, at every 8 msec) while the vehicle cruises at a substantially constant speed. When the program enters the torque control routine of FIG. 6, the control CPU 90 of the controller 80 first receives data of revolving speed Nd of the drive shaft 22 at step S100. The revolving speed Nd of the drive shaft 22 can be calculated from the rotational angle θd of the drive shaft 22, which is read from the resolver 48 attached to the drive shaft 22. The control CPU 90 then receives data of revolving speed Nv of the rotating shaft 57e of the multiplying gear unit 57 at step S102. The revolving speed Nv of the rotating shaft 57e can be calculated from the rotational angle θv of the rotating shaft 57e, which is read from the resolver 39 attached to the rotating shaft 57e. A revolving speed difference Nc is calculated from the input revolving speed Nd of the drive shaft 22 and the input revolving speed Nv of the rotating shaft 57e of the multiplying gear unit 57 (Nc=Nv−Nd) at step S104.

The control CPU 90 then reads the accelerator pedal position AP detected by the accelerator pedal position sensor 65 at step S106. The driver steps on the accelerator pedal 64 when feeling insufficiency of the output torque. The value of the accelerator pedal position AP accordingly represents the output torque which the driver requires (that is, the torque to be output to the drive shaft 22). At subsequent step S108, the control CPU 90 determines an output torque command value Td* or a target torque to be output to the drive shaft 22, based on the input accelerator pedal position AP. In this embodiment, a map representing the relationship between the output torque command value Td* and the accelerator pedal position AP is prepared in advance and stored in the ROM 90b. In accordance with a concrete procedure, at step S108, the torque command value Td* corresponding to the input accelerator pedal position AP is read from the map stored in the ROM 90b.

At step S110, an amount of energy Pd to be output to the drive shaft 22 is calculated from the output torque command value Td* and the input revolving speed Nd of the drive shaft 22 according to the equation of Pd=Td*×Nd. The program then proceeds to step S112 at which the control CPU 90 sets a target torque Te* and a target revolving speed Ne* of the engine 50 based on the output energy Pd thus obtained. On the assumption that the energy Pd to be output to the drive shaft 22 is all supplied by the engine 50, the energy supplied by the engine 50 is equal to the product of the torque Te and the revolving speed Ne of the engine 50, so that the relationship between the output energy Pd and the target torque Te* and the target revolving speed Ne* of the engine 50 can be expressed as Pd=Te*×Ne*. There are, however, numerous combinations of the target torque Te* and the target revolving speed Ne* of the engine 50 satisfying the above relationship. In this embodiment, a favorable combination of the target torque Te* and the target revolving speed Ne* of the engine 50 is set in order to enable the engine 50 to be driven at the highest possible efficiency.

The quotient obtained by dividing the preset target torque Te* by the multiplying ratio ρ is set as a torque command value Tc* of the clutch motor 30 at step S114. In order to keep the revolving speed Ne of the engine 50 substantially constant, it is required to make the torque applied by the clutch motor 30 to the crankshaft 56 of the engine 50 via the multiplying gear unit 57 equal to the torque Te of the engine 50. The control CPU 90 accordingly takes into account the multiplying ratio ρ of the multiplying gear unit 57 and sets the quotient obtained by dividing the target torque Te* of the engine 50 by the multiplying ratio ρ to the torque command value Tc* of the clutch motor 30.

The control CPU 90 then calculates an electric power Pc generated or consumed by the clutch motor 30 according to Equation (1) given below at step S116. Nc in Equation (1) represents the revolving speed difference between the rotating shaft 57e of the multiplying gear unit 57 and the drive shaft 22, so that the multiplication Nc×Tc* corresponds to determination of the energy defined as the area G1, G5, or G9 in the drawings of FIGS. 3 through 5 under the condition of the preset command values. Ksc denotes an efficiency of the clutch motor 30. The control CPU 90 subsequently calculates a torque command value Ta* of the assist motor 40 to be output to the drive shaft 22 according to Equation (2) given below at step S118. In Equation (2), Ksa represents an efficiency of the assist motor 40.

$$Pc = Ksc \times Nc \times Tc \qquad (1)$$

$$Ta^* = Ksa \times Pc/Nd \qquad (2)$$

After setting the target torque Te* and the target revolving speed Ne* of the engine 50 and the torque command values Tc* and Ta* of the clutch motor 30 and the assist motor 40, the program proceeds to steps S120, S122, and S124 to respectively control the clutch motor 30, the assist motor 40, and the engine 50 based on these values. For convenience of illustration, the control operations of the clutch motor 30, the assist motor 40, and the engine 50 are shown as separate steps in the torque control routine of this embodiment. In the actual procedure, however, these control operations are carried out in parallel and comprehensively. By way of example, the control CPU 90 controls the clutch motor 30 and the assist motor 40 simultaneously by utilizing an interrupting process, while transmitting an instruction to the EFIECU 70 through communication in order to allow the EFIECU 70 to control the engine 50 concurrently.

Figure 7:
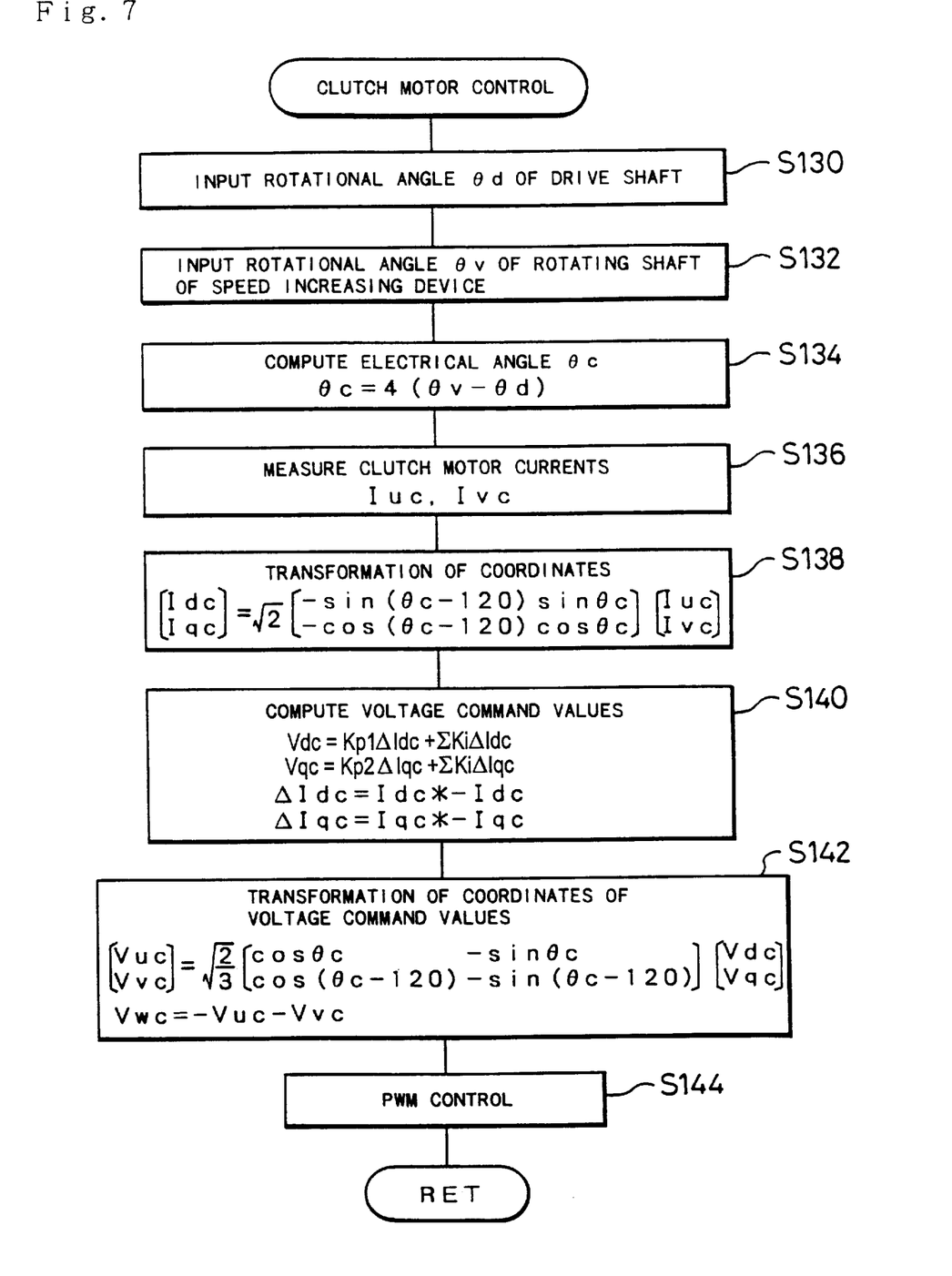
FIG. 7 is a flowchart showing a clutch motor control routine executed by the control CPU 90 of the controller 80.

The control procedure of the clutch motor 30 executed at step S120 in the flowchart of FIG. 6 follows a clutch motor control routine shown in the flowchart of FIG. 7. When the program enters the clutch motor control routine, the control CPU 90 of the controller 80 first reads the rotational angle θd of the drive shaft 22 from the resolver 48 and the rotational angle θv of the rotating shaft 57e of the multiplying gear unit 57 from the resolver 39 at steps S130 and S132. The control CPU 90 then computes an electrical angle θc of the clutch motor 30 from the input rotational angles θd and θv at step S134. A synchronous motor having four pairs of poles is used as the clutch motor 30 in this embodiment, and the electrical angle θc is thus calculated according to an equation of θc=4(θv−θd).

The program proceeds to step S136, at which the control CPU 90 reads the clutch motor currents Iuc and Ivc, which respectively flow through the U phase and V phase of the three-phase coils 36 in the clutch motor 30 and are measured by the ammeters 95 and 96. Although the electric currents naturally flow through all the three phases U, V, and W, measurement is required only for the electric currents passing through the two phases since the sum of the currents is equal to zero. At subsequent step S138, the control CPU 90 executes transformation of coordinates (three-phase to two-phase transformation) using the values of electric currents flowing through the three phases obtained at step S136. The transformation of coordinates maps the values of electric currents flowing through the three phases to the values of electric currents passing through d and q axes of the permanent magnet-type synchronous motor and is implemented by the arithmetic operation of Equation (3) given below.

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \qquad (3)$$

The transformation of coordinates is carried out because the electric currents flowing through the d and q axes are essential quantities for the torque control in the permanent magnet-type synchronous motor. Alternatively, the torque control may be executed directly with the electric currents flowing through the three phases. After the transformation to the electric currents of two axes, the control CPU 90 computes deviations of electric currents Idc and Iqc actually flowing through the d and q axes from electric current command values Idc* and Iqc* of the respective axes, which are calculated from the torque command value Tc* of the clutch motor 30, and subsequently determines voltage command values Vdc and Vqc with respect to the d and q axes at step S140. In accordance with a concrete procedure, the control CPU 90 executes arithmetic operations of Equations (4) and Equations (5) given below. In Equations (5), Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term in the right side of Equation (5)) and a summation of historical data of the deviations ΔI for 'i' times (the second term in the right side).

$$\Delta Idc = Idc^* - Idc$$

$$\Delta Iqc = Iqc^* - Iqc \qquad (4)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \qquad (5)$$

The control CPU 90 then re-transforms the coordinates of the voltage command values thus obtained (two-phase to three-phase transformation) at step S142. This corresponds to an inverse of the transformation executed at step S138. The inverse transformation determines voltages Vuc, Vvc, and Vwc actually applied to the three-phase coils 36 as expressed by Equations (6) given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \qquad (6)$$

$$Vwc = -Vuc - Vvc$$

The actual voltage control is accomplished by on-off operation of the transistors Tr1 through Tr6 in the first driving circuit 91. At step S144, the on- and off-time of the transistors Tr1 through Tr6 in the first driving circuit 91 is PWM (pulse width modulation) controlled in order to attain the voltage command values Vuc, Vvc, and Vwc determined by Equations (6) above.

The torque command value Tc* of the clutch motor 30 is positive when a positive torque is applied to the drive shaft 22 in the direction of rotation of the drive shaft 22 while the vehicle moves forward. By way of example, it is assumed that a positive value is set to the torque command value Tc*. When the revolving speed Nv of the rotating shaft 57e is greater than the revolving speed Nd of the drive shaft 22 on this assumption, that is, when the revolving speed difference Nc (=Nv−Nd) is positive, the clutch motor 30 is controlled to carry out the regenerative operation and produce a regenerative electric current corresponding to the revolving speed difference Nc. When the revolving speed Nv of the rotating shaft 57e is lower than the revolving speed Nd of the drive shaft 22, that is, when the revolving speed difference NC (=Nv−Nd) is negative, on the contrary, the clutch motor 30 is controlled to carry out the power operation and rotate relative to the rotating shaft 57e in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the revolving magnetic field generated by the electric currents flowing through the three-phase coils 36 mounted on the inner rotor 34 of the clutch motor 30. The identical switching control is executed for both the regenerative operation and the power operation of the clutch motor 30 as long as the sign of the torque command value Tc* is not changed. The clutch motor control routine of FIG. 7 is thus applicable to both the regenerative operation and the power operation. Under the condition of braking the drive shaft 22 or moving the vehicle in reverse, the torque command value Tc* has the negative sign. The clutch motor control routine of FIG. 7 is also applicable to the control procedure under such conditions, when the electrical angle θc obtained at step S104 is varied in the reverse direction.

Figure 8:
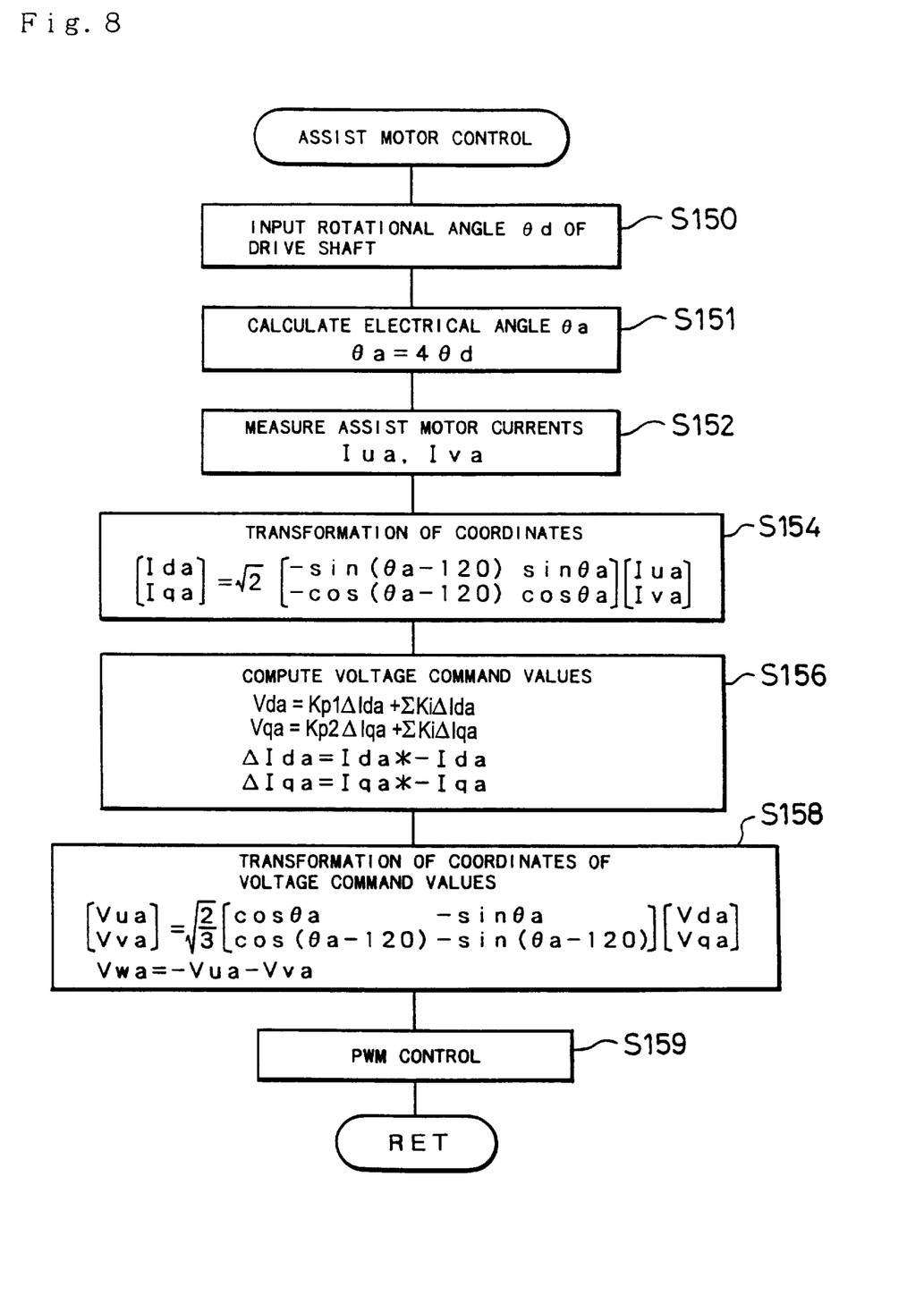
FIG. 8 is a flowchart showing an assist motor control routine executed by the control CPU 90 of the controller 80.

The control procedure of the assist motor 40 executed at step S122 in the flowchart of FIG. 6 follows an assist motor control routine shown in the flowchart of FIG. 8. When the program enters the assist motor control routine, the control CPU 90 of the controller 80 first reads the rotational angle θd of the drive shaft 22 from the resolver 48 at step S150, and calculates an electrical angle θa of the assist motor 40 from the measured rotational angle θd at step S151. In this embodiment, a synchronous motor having four pairs of poles is used as the assist motor 40, and the electrical angle θa is thus obtained by an equation of θa=4θd. The control CPU 90 then receives data of assist motor currents Iua and Iva at step S152, which respectively flow through the U phase and V phase of the three-phase coils 44 in the assist motor 40 and are measured with the ammeters 97 and 98. The control CPU 90 subsequently executes transformation of coordinates for the electric currents of the three phases at step S154, computes voltage command values Vda and Vqa at step S156, and executes inverse transformation of coordinates for the voltage command values at step S158. At subsequent step S159, the control CPU 90 determines the on- and off-time of the transistors Tr11 through Tr16 in the second driving circuit 92 for PWM (pulse width modulation) control. The processing executed at steps S154 through S159 is similar to that executed at steps S138 through S144 in the clutch motor control routine shown in the flowchart of FIG. 7.

The torque command value Ta* of the assist motor 40 is obtained by the arithmetic operations including the revolving speed difference Nc and the torque command value Tc* of the clutch motor 30 and executed at steps S116 and S118 in the flowchart of FIG. 6. While the vehicle moves forward, when the revolving speed Nv of the rotating shaft 57e is higher than the revolving speed Nd of the drive shaft 22, that is, when the revolving speed difference Nc is positive, a positive value is set to the torque command value Ta* and the assist motor 40 thereby carries out the power operation. When the revolving speed Nv of the rotating shaft 57e is lower than the revolving speed Nd of the drive shaft 22, that is, when the revolving speed difference Nc is negative, on the contrary, a negative value is set to the torque command value Ta* and the assist motor 40 thereby carries out the regenerative operation. Like the control of the clutch motor 30, the assist motor control routine shown in the flowchart of FIG. 8 is applicable to both the power operation and the regenerative operation of the assist motor 40. This is also true when the vehicle moves back. It is here assumed that the torque command value Ta* of the assist motor 40 is positive when a positive torque is applied to the drive shaft 22 in the direction of rotation of the drive shaft 22 while the vehicle moves forward.

The control of the engine 50 (step S124 in the flowchart of FIG. 6) is executed in the following manner. In order to enable the engine 50 to be stationarily driven at the driving point defined by the target engine torque Te* and the target engine speed Ne* set at step S112 in the flowchart of FIG. 6, the control CPU 90 regulates the torque Te and the revolving speed Ne of the engine 50. In accordance with a concrete procedure, the control CPU 90 of the controller 80 transmits an instruction to the EFIECU 70 through communication, and the EFIECU 70 regulates the amount of fuel injection from the fuel injection valve 51 and the position of the throttle valve 66, thereby enabling the output torque and the revolving speed of the engine 50 to gradually approach to the target engine torque Te* and the target engine speed Ne*. The torque Te of the engine 50 depends upon the loading torque, and the torque Tc of the clutch motor 30 to give this loading torque is set as the torque command value Tc* by the control operation of the clutch motor 30 executed at step S120 in the flowchart of FIG. 6 (Tc*=Te*). The control operation of the engine 50 is accordingly carried out to make the revolving speed of the engine 50 approach to the target engine speed Ne*.

Figure 9:
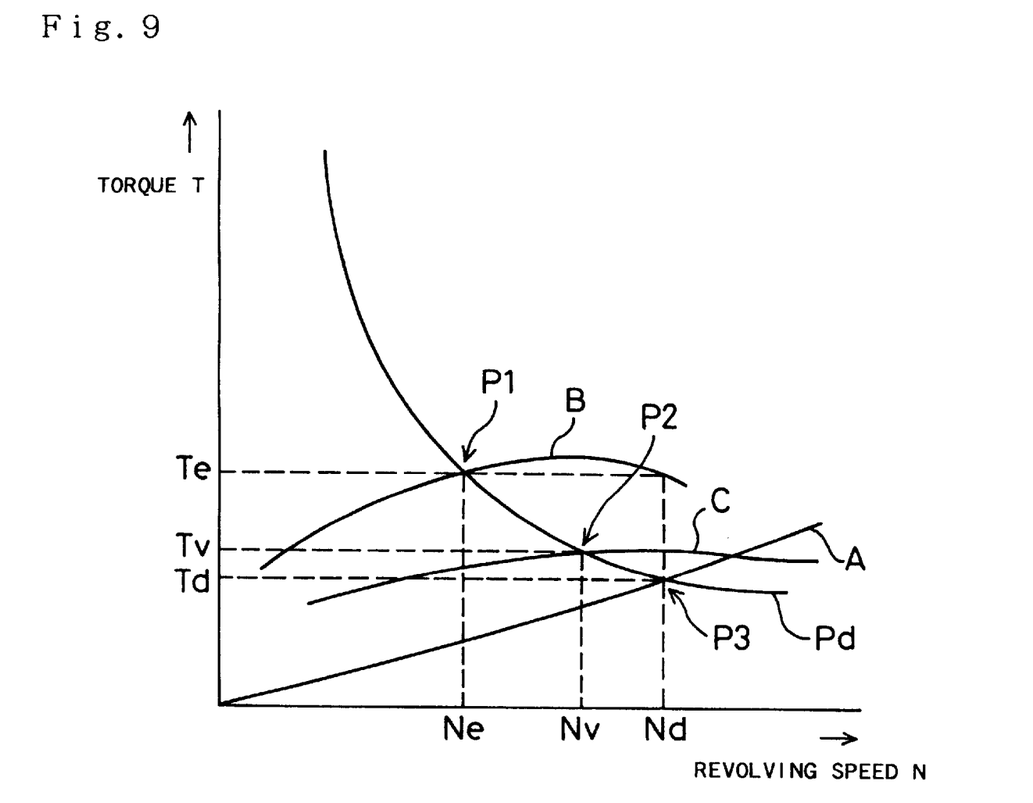
FIG. 9 is a graph showing operation of the power output apparatus 20 when the torque control routine of FIG. 6 is carried out.

The above processing enables the energy Pe output from the engine 50 to be subjected to the torque conversion by the clutch motor 30 and the assist motor 40 and applied to the drive shaft 22. FIG. 9 shows the state of such torque conversion. The curve A represents a variation in torque Td to be output to the drive shaft 22 of the vehicle that cruises at a constant speed on a flat road surface. The curve B represents the driving points at which the engine 50 is driven to attain the highest possible efficiency with respect to the output energy, whereas the curve C represents the points at which the rotating shaft 57e of the multiplying gear unit 57 is driven when the engine 50 is driven at the driving points on the curve B. It is here assumed that the drive shaft 22 is rotated at a fixed revolving speed Nd and the vehicle thereby cruises at a constant speed. Under such a condition, the torque to be output to the drive shaft 22, which is determined according to the step-on amount of the accelerator pedal 64, has a value Td, and the energy to be output from the engine 50 becomes equal to a value Pd given as the product of the revolving speed Nd and the torque Td. The engine 50 is driven at a driving point P1 defined by the revolving speed Ne and the torque Te and given as an intersection of the constant energy-Pd curve and the curve B. The rotating shaft 57e of the multiplying gear unit 57 is driven at a driving point P2 defined by the calculated revolving speed Nv (Nv =Ne×ρ) and the calculated torque Tv (Tv=Te/ρ). The power transmitted to the rotating shaft 57e is converted by the clutch motor 30 and the assist motor 40 and output to the drive shaft 22 as the power defined by the revolving speed Nd and the torque Td. The driving state of FIG. 9 is identical with the driving state of FIG. 4 discussed above. Both the clutch motor 30 and the assist motor 40 in this structure accordingly have a smaller energy loss, compared with those in the structure without the multiplying gear unit 57. This effectively enhances the efficiency of the whole power output apparatus 20.

The structure of the power output apparatus 20 of the embodiment reduces the energy transmission by the clutch motor 30 and the assist motor 40 and decreases the energy loss of both the motors 30 and 40, thereby enhancing the efficiency of the whole power output apparatus 20. This structure also decreases the capacities required for the clutch motor 30 and the assist motor 40 and reduces the size of the motors 30 and 40, thereby reducing the size of the whole power output apparatus 20.

Figure 10:
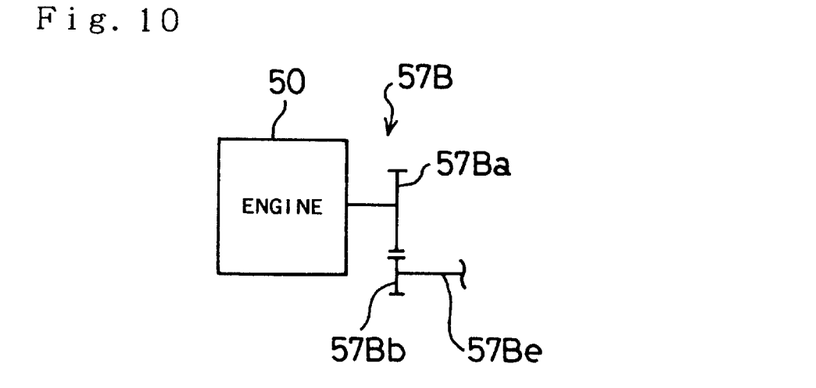
FIG. 10 schematically illustrates structure of a modified multiplying gear unit 57B.

In the power output apparatus 20 of the embodiment, a planetary gear is applied for the multiplying gear unit 57. Another applicable multiplying gear unit 57B shown in FIG. 10 has two gears 57B$a$ and 57B$b$ engaging with each other. When the power is output from the engine 50 to the crankshaft 56, the multiplying gear unit 57B of this modified structure multiplies the revolving speed but reduces the torque by taking into account a multiplying ratio $\rho$, and transmits the increased revolving speed and the decreased torque to a rotating shaft 57B$e$ which is not coaxial with the crankshaft 56. A variety of other multiplying gear units are also usable in the structure of the power output apparatus 20.

Although the multiplying gear unit 57 is attached to the crankshaft 56 of the engine 50 in the power output apparatus 20 of the embodiment, a reduction gear in place of the multiplying gear unit 57 may be incorporated in the power output apparatus 20 mounted on the vehicle which is required to output a low revolving speed but a high torque. By way of example, the multiplying gear unit 57 functions as a reduction gear when the ring gear 57$b$ is linked with the rotating shaft 57$e$ and the sun gear 57$a$ is connected to the crankshaft 56 in the multiplying gear unit 57 of FIG. 1. In this case, a reduction ratio p ($p=1/\rho$) is used for the calculation in place of the multiplying ratio $\rho$ and a low-speed, high-torque motor is used as the clutch motor 30.

In the structure of the power output apparatus 20 of the embodiment discussed above, the clutch motor 30 and the assist motor 40 are separately attached to the different positions of the drive shaft 22. Like another power output apparatus 20A illustrated in FIG. 11 as a modified example, however, the clutch motor and the assist motor may be joined integrally with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. A non-magnetic member is interposed between the magnetic pole on the outer surface and the magnetic pole on the inner surface. An assist motor 40A includes the outer rotor 32A of the clutch motor 30A and a stator 43 with three-phase coils 44 mounted thereon. In this structure, the outer rotor 32A of the clutch motor 30A also works as the rotor of the assist motor 40A. Since the three-phase coils 36A are mounted on the inner rotor 34A linked with the crankshaft 56, the slip ring 38 for supplying electric power to the three-phase coils 36A of the clutch motor 30A is attached to the crankshaft 56.

Figure 11:
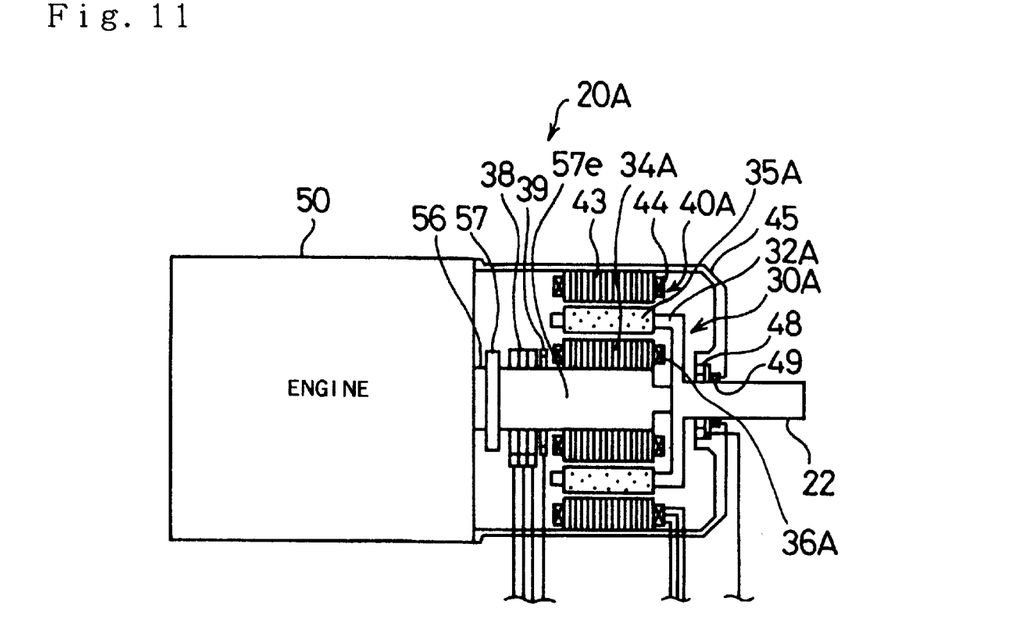
FIG. 11 schematically illustrates another power output apparatus 20A as a modified example.

In the power output apparatus 20A, the voltage applied to the three-phase coils 36A on the inner rotor 34A is controlled against the inner-surface magnetic pole of the permanent magnets 35A set on the outer rotor 32A. This enables the clutch motor 30A to work in the same manner as the clutch motor 30 of the power output apparatus 20 of the embodiment having the clutch motor 30 and the assist motor 40 separately attached to the drive shaft 22. The voltage applied to the three-phase coils 44 on the stator 43 is controlled against the outer-surface magnetic pole of the permanent magnets 35A set on the outer rotor 32A. This enables the assist motor 40A to work in the same manner as the assist motor 40 of the power output apparatus 20. The power output apparatus 20A of the modified structure accordingly works in the same manner as the power output apparatus 20 of the embodiment. The outer rotor 32A functions concurrently as one of the rotors in the clutch motor 30A and as the rotor of the assist motor 40A, thereby effectively reducing the size and weight of the power output apparatus 20A.

Figure 12:
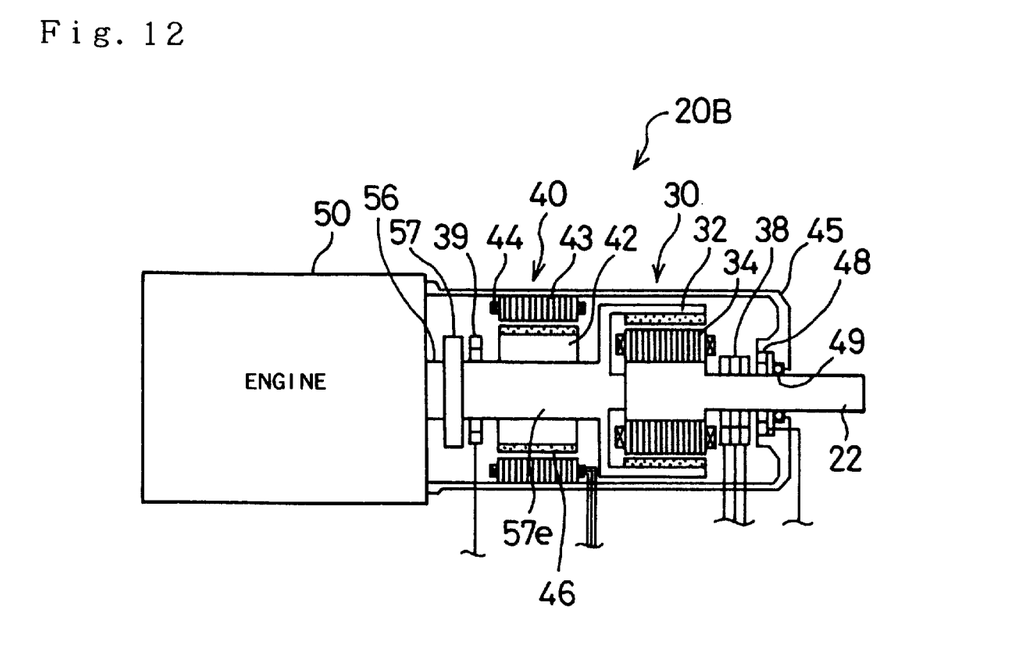
FIG. 12 schematically illustrates still another power output apparatus 20B as another modified example.

In the power output apparatus 20 of the embodiment, the assist motor 40 is attached to the drive shaft 22. The assist motor 40 may, however, be attached to the crankshaft 56 of the engine 50 or the rotating shaft 57$e$ of the multiplying gear unit 57 like another power output apparatus 20B shown in FIG. 12. In case that the assist motor 40 is attached to the rotating shaft 57$e$ of the multiplying gear unit 57, the torque Ta of the assist motor 40 and the torque Tc of the clutch motor 30 are regulated to satisfy Equations (7) and (8) given below. The power output from the rotating shaft 57$e$ of the multiplying gear unit 57 can thus be subjected to the torque conversion and applied to the drive shaft 22. The relationships of Equations (7) and (8) represent the ideal state on the assumption that both the clutch motor 30 and the assist motor 40 have the efficiency of 100%. Tc×Nd and Ta in the actual state are a little smaller than those in the ideal state. In case that the assist motor 40 is attached to the crankshaft 56 of the engine 50, the torque Tv and the revolving speed Nv of the rotating shaft 57$e$ of the multiplying gear unit 57 in Equations (7) and (8) are replaced by the torque Te and the revolving speed Ne of the engine 50. In the modified structure with a reduction gear in place of the multiplying gear unit 57, the assist motor 40 may also be attached to the crankshaft 56 of the engine 50 or the rotating shaft 57$e$.

$$Tv \times Nv = Tc \times Nd \quad (7)$$

$$Tv + Ta = Tc = Td \quad (8)$$

The present invention is not restricted to the above embodiment or its modified examples, but there may be many modifications, changes, and alterations without departing from the scope or spirit of the main characteristics of the present invention.

Figure 13:
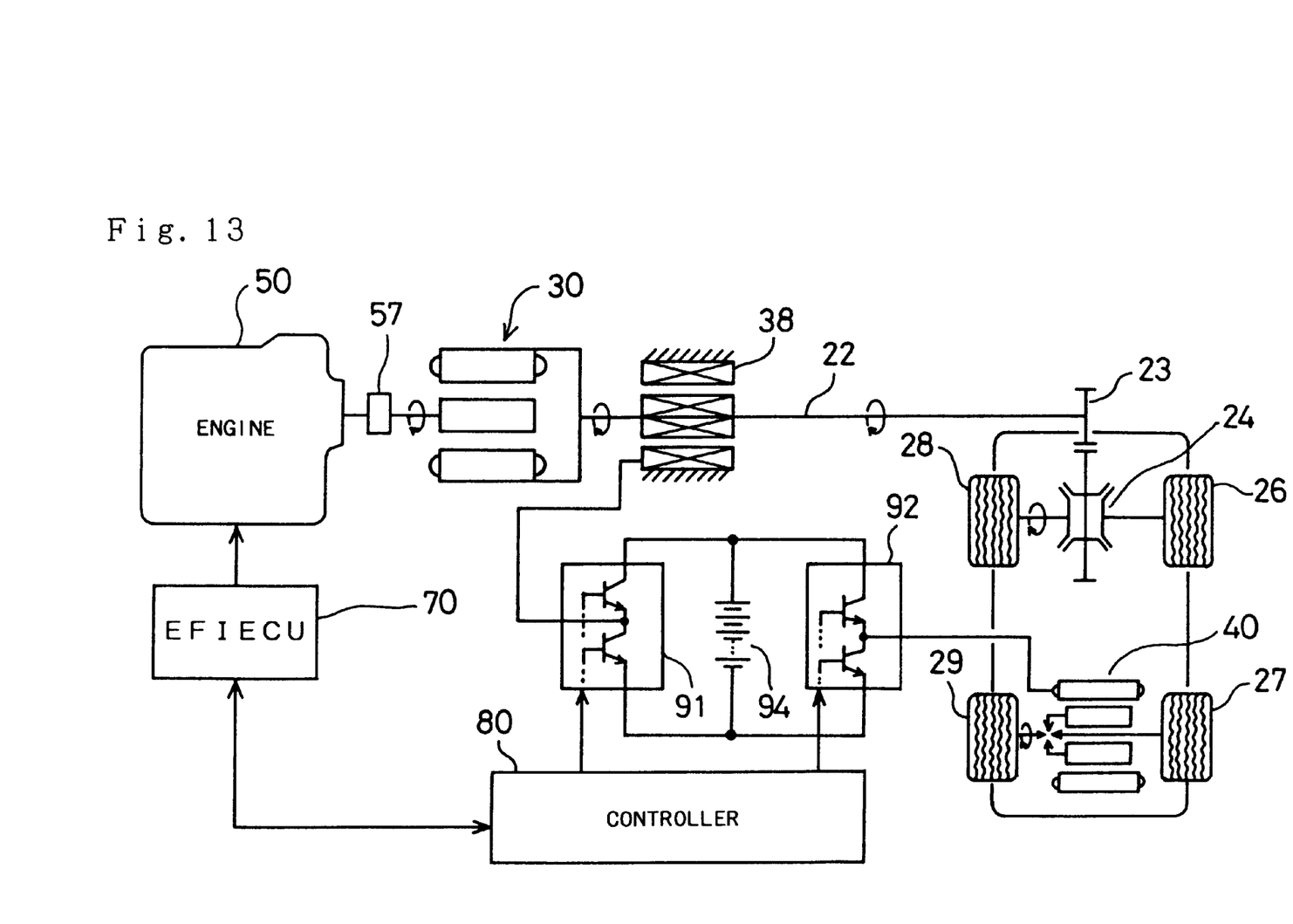
FIG. 13 schematically illustrates structure of a four-wheel-drive vehicle with the power output apparatus 20 incorporated therein.

For example, the power output apparatus 20 of the embodiment and its modified examples discussed above are applied to the FR-type or FF-type two-wheel-drive vehicle. In another modified example of FIG. 13, however, a power output apparatus 20C is applied to a four-wheel-drive vehicle. In the structure of FIG. 13, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23, so as to drive front driving wheels 26 and 28. This structure exerts the same effects as those of the embodiment discussed above.

The gasoline engine driven by means of gasoline is used as the engine 50 in the power output apparatus 20 of the embodiment discussed above. The principle of the invention is, however, applicable to other internal combustion engines and external combustion engines, such as Diesel engines, turbine engines, and jet engines.

In the power output apparatus 20 of the embodiment, permanent magnet (PM)-type synchronous motors are used for the clutch motor 30 and the assist motor 40. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

In the power output apparatus 20 of the embodiment, the slip ring 38 is used as the transmission means of the power to the clutch motor 30. The slip ring 38 may, however, be replaced by a rotary transformer, a semiconductor coupling of magnetic energy, or the like.

In the power output apparatus 20 of the embodiment, transistor inverters are used for the first and the second driving circuits 91 and 92. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus 20 of the embodiment is mounted on the vehicle, it may be mounted on other transportation means like ships and airplanes as well as a variety of industrial machines.

It should be clearly understood that the above embodiment is only illustrative and not restrictive in any sense. The scope and spirit of the present invention are limited only by the terms of the appended claims.

What is claimed is:

1. A power output apparatus for outputting power to a drive shaft, said power output apparatus comprising:

an engine having a rotating output shaft;

a revolving speed multiplying means connected with said output shaft of said engine and a rotating shaft that is different from said output shaft, said revolving speed multiplying means multiplying a revolving speed of said output shaft of said engine by a predetermined ratio applied to the rotating shaft such that the rotating shaft rotates at a higher speed than the output shaft of the engine;

a pair-rotor motor having a first rotor connected with said rotating shaft of said revolving speed multiplying means and a second rotor linked with said drive shaft to be rotatable relative to said first rotor, wherein power is transmitted between said rotating shaft of said revolving speed multiplying means and said drive shaft via an electromagnetic coupling of said first rotor with said second rotor; and a second motor for inputting and outputting power to and from said drive shaft.

2. A power output apparatus in accordance with claim 1, said power output apparatus further comprising a control means for driving and controlling said pair-rotor motor and said second motor, in order to enable power output from said engine via said revolving speed multiplying means to be subjected to a torque conversion by said pair-rotor motor and said second motor and output to said drive shaft.

3. A power output apparatus in accordance with claim 1, wherein said second motor comprises said second rotor of said pair-rotor motor and a stator that can rotate said second rotor.

4. A power output apparatus for outputting power to a drive shaft, said power output apparatus comprising:

an engine having a rotating output shaft;

a revolving speed multiplying means connected with said output shaft of said engine and a rotating shaft that is different from said output shaft, said revolving speed multiplying means multiplying a revolving speed of said output shaft of said engine by a predetermined ratio applied to the rotating shaft such that the rotating shaft rotates at a higher speed than the output shaft of the engine;

a pair-rotor motor having a first rotor connected with said rotating shaft of said revolving speed multiplying means and a second rotor linked with said drive shaft to be rotatable relative to said first rotor, wherein power is transmitted between said rotating shaft of said revolving speed multiplying means and said drive shaft via an electromagnetic coupling of said first rotor with said second rotor; and a second motor for inputting and outputting power to and from said rotating shaft of said revolving speed multiplying means.

5. A power output apparatus in accordance with claim 4, said power output apparatus further comprising a control means for driving and controlling said pair-rotor motor and said second motor, in order to enable power output from said engine via said revolving speed multiplying means to be subjected to a torque conversion by said pair-rotor motor and said second motor and output to said drive shaft.

6. A power output apparatus for outputting power to a drive shaft, said power output apparatus comprising:

an engine having a rotating output shaft;

a revolving speed multiplying means connected with said output shaft of said engine and a rotating shaft that is different from said output shaft, said revolving speed multiplying means multiplying a revolving speed of said output shaft of said engine by a predetermined ratio applied to the rotating shaft such that the rotating shaft rotates at a higher speed than the output shaft of the engine;

a pair-rotor motor having a first rotor connected with said rotating shaft of said revolving speed multiplying means and a second rotor linked with said drive shaft to be rotatable relative to said first rotor, wherein power is transmitted between said rotating shaft of said revolving speed multiplying means and said drive shaft via an electromagnetic coupling of said first rotor with said second rotor; and a second motor for inputting and outputting power to and from said output shaft of said engine.

7. A power output apparatus in accordance with claim 6, said power output apparatus further comprising a control means for driving and controlling said pair-rotor motor and said second motor, in order to enable power output from said engine via said revolving speed multiplying means to be subjected to a torque conversion by said pair-rotor motor and said second motor and output to said drive shaft.

* * * * *